Feb. 3, 1953 J. M. PICKEL 2,627,142
GRINDING ATTACHMENT FOR LAWN MOWER SHARPENING MACHINES
Filed April 27, 1950
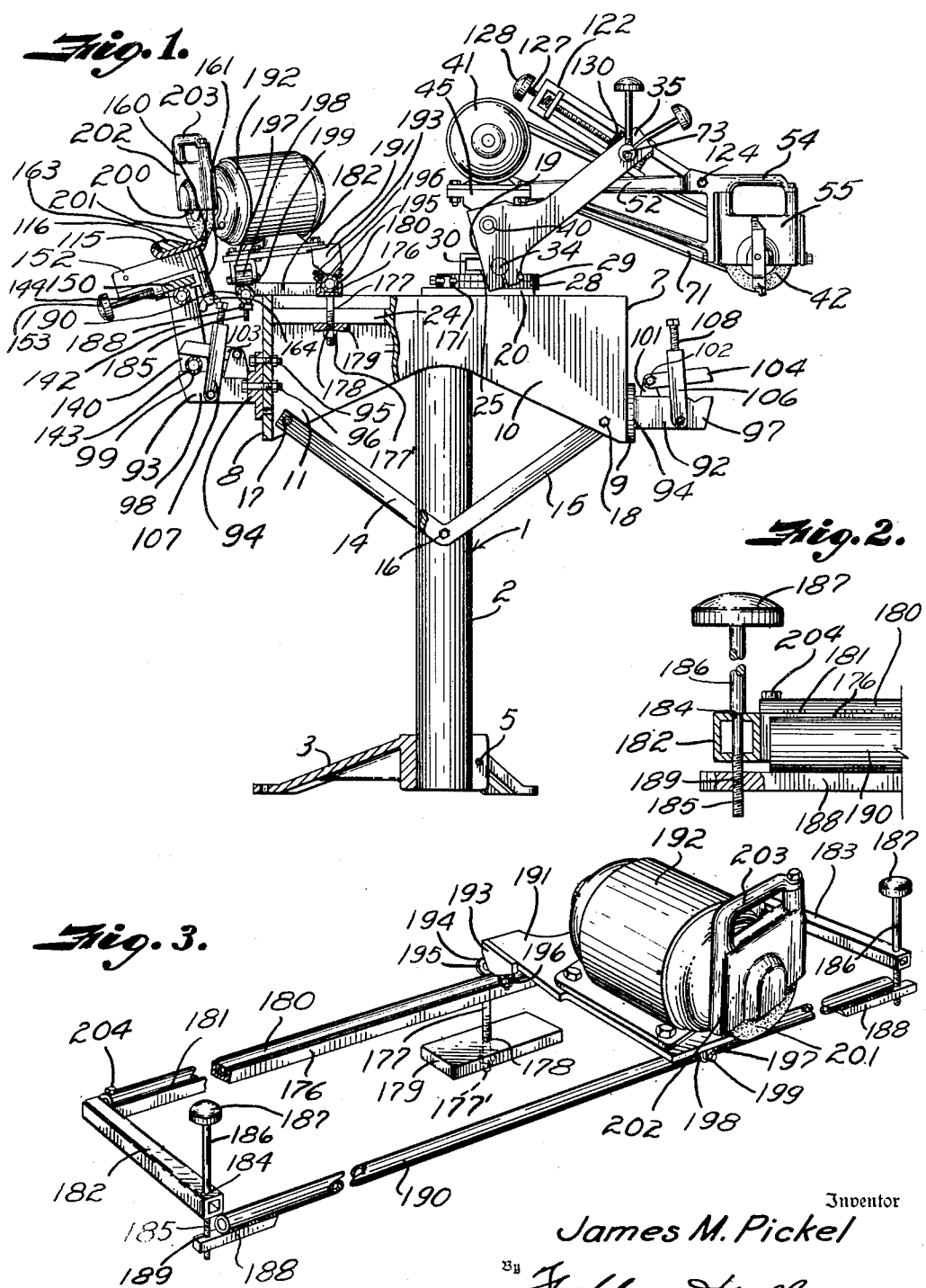
Inventor
James M. Pickel
By Fishburn Mullendore
Attorneys

Patented Feb. 3, 1953

2,627,142

UNITED STATES PATENT OFFICE 2,627,142

GRINDING ATTACHMENT FOR LAWN MOWER SHARPENING MACHINES

James M. Pickel, Kansas City, Mo., assignor to Oscar C. Rink, Liberty, Mo.

Application April 27, 1950, Serial No. 158,445

3 Claims. (Cl. 51—34)

This invention relates to an attachment for a grinding device for sharpening lawn mowers, and more particularly to an attachment for sharpening the stationary or bed blade of such mower.

The present application discloses matter disclosed and claimed in co-pending application Serial No. 158,367, filed April 27, 1950, the applicant in said co-pending application being assignee of the entire rights in the present application.

In reel type mowers the stationary bed blade or knife is secured to a bracket member and cooperates with the curved blades on the reel for cutting the grass as the mower is propelled over the ground. The bed blade must be sharpened at intervals and it is necessary to remove the bracket and blade in order to accomplish this purpose.

The principal object of the present invention is to provide an attachment for sharpening the bed blade of a lawn mower after it has been removed from the mower, and it is particularly designed for use on a support of a grinding machine for lawn mowers wherein the entire lawn mower is held on one end of the support opposite from the end upon which the attachment is held.

Other objects of the present invention are to provide clamping means on one end of a support adapted for mounting the bed blade thereon; to provide a trackway on said platform including a mounting for a motor for carrying a grinding wheel; to provide rollers for mounting of the support for the motor on one of said tracks and a roller mounting on the other track; to provide means for movement of one of said tracks relative to the other so as to adjust the cutting wheel to the bed blade for movement of the cutting wheel therealong; and to provide a device of this character, simple, economical to manufacture and efficient in operation.

In accomplishing these and other objects of the present invention, I have provided improved structure the preferred forms of which are illustrated in the accompanying drawings; wherein:

Fig. 1 is a side view of a lawn mower grinding machine partly in cross section, and illustrating the supporting platform and the main grinding wheel mechanism with the present attachment mounted thereon.

Fig. 2 is a vertical cross sectional view showing the adjusting means for the attachment.

Fig. 3 is a perspective view of the trackway and motor mounting of the attachment shown disassembled from the platform of the grinding machine.

Referring more in detail to the drawing:

1 designates a grinding machine for lawn mowers having a tubular standard 2, provided with a plurality of removable feet 3, clamped to the lower portion of the standard by bolts 5. Mounted on the standard 2 is a platform 7 preferably a casting having end portions 8 and 9 and sides 10 and 11. The platform is secured to the standard 2 by bolts or the like (not shown). A pair of braces 14 and 15 are provided on each side of the standard and secured thereto by a bolt 16, the other end of the braces being secured to the respective sides 10 and 11 of the platform near the ends 8 and 9 by bolts 17 and 18 to form a rigid structure.

A frame structure 19 is slidably and rotatably mounted on the platform 7. A plate 20, having depending flanges near its respective ends is provided for movement across the top of the platform 7. A plate 28 is welded to the plate 20 and a plate 29 is welded to the underneath side substantially near the center of a base plate 30 of the frame 19. The base plate 30, plates 29, 28 and 20 are centrally bored and a base reinforcement plate 25 is also centrally bored and threaded for receiving the threaded end of a bolt (not shown) to hold the frame 19 to the platform 7. By loosening of the bolt, the frame may be moved longitudinally of the platform 8 as desired.

Mounted on the respective ends of the base plate 30 are short shafts 34 forming trunnions for a pair of bracket arms 35, the trunnions extending into openings in the respective ends of the arm. The bracket arms 35 have an enlarged base ends provided with openings spaced from the openings for the trunnions to accommodate the ends of a tube 40, forming a trackway for mounting of a motor 41 thereon, for driving a grinding wheel 42. The carriage 45 is movable on the tube 40 so the motor 41 may be moved thereacross.

An arm 52 is mounted on the motor carriage for mounting of the grinding wheel thereon. The outer end of the arm 52 is provided with a head 54 consisting of a housing 55. The housing 55 is provided on one side of the head 54 for a pulley (not shown) mounted on the shaft of the grinding wheel and over which a belt 71 runs to the pulley (not shown) on the motor 41 for rotating the grinding wheel 42 upon operation of the motor as is the usual practice. The outer ends of the arms 35 are provided with means as indicated at 73 for adjusting the grinding wheel to the work but this mechanism forms no part of the present invention.

Mounted on the respective ends 8 and 9 of the platform 7 near the lower portion thereof are clamping devices 92 and 93. As these clamping devices are substantially identical, only one will be described. A plate 94 is secured to the end 8 of the platform by bolts 95 and 96 and formed integral with the plate 94 are outwardly extending base arms 97 and 98 having notches 99 in their upper edges providing lower jaws. Extending upwardly near the plate 94 on each arm are ears 101 to which jaws 103 and 104 are pivotally mounted by bolts 102, the jaws 103 and 104 being positioned above the jaws 97 and 98. The lower jaws are provided with an opening near the outer end for pivotally mounting, by means of bolts or the like, clevises 106 and 107. The outer end of the clevises are bored and threaded for set screws 108.

The grinding wheel 42 is adjusted in respect to the reel of a lawn mower by means of a U-shaped member 122 attached at one end by bolt 124 to the arm 52 and is provided with a threaded pin 127 having a handle 128, the lower end of said pin being rotatably secured in a roller bearing support member 130 that rides a tube parallel to and spaced from tube 40. Thus by rotating the pin 127 the grinding wheel 42 is raised or lowered as desired.

115 designates the stationary or bed blade of a mower which runs parallel with the spiral blades on the reel of the mower, the blade being provided with a sharp edge and secured to a bracket 116 having its respective ends secured to the frame of the mower as is in usual practice.

140 designates a frame comprising spaced arms 142 provided with openings near the respective ends adapted to receive the ends of rods 143 and 144, the ends of the rod 143 providing trunnions upon which the arms 142 are mounted. The rod 143 is clamped between the jaws 98 and 103 and held securely therein by tightening of the screw 108, in the clevis 107. Slots (not shown) are provided in the respective ends of the arms 142 and set screws (not shown) adapted to engage the threaded lateral openings in the ends of the arms for adjustably retaining the rod therein. The plate 150 which engages over the top of the rod 144 is welded thereto. A pair of clamping members 152 is provided for holding the blade 115 on the plate 150, the clamping members having flanges depending from outer edges thereof and provided with threaded bore openings adapted to receive the threaded ends of locking pins 153 provided with heads to facilitate loosening and tightening thereof. The opposite ends of the clamping members are provided with inwardly extending flanges adapted to engage the underneath side of the plate 150. Tightening of the locking pin on the plate 150 will hold the clamping member in the desired place to accommodate stationary blades of different lengths.

In order to mount the stationary blade for sharpening on the framework structure, the clamping members 152 are provided with webs 160, and attached by welding or other suitable means to the outer side of the web is a tubular member 161 in which is adapted to extend a pin having its upper ends turned to form a hook 163, the other end being threaded to accommodate a thumb nut 164 for holding the blade 115 on the frame work structure.

Referring particularly to the attachment for the machine as embodied in the present invention, it will be noted that the plate 94 for securing the clamping member 93 to the end 8 of the platform is mounted higher than the clamping member on the opposite end 9. The end plate 8 being provided with an opening below the opening for the lower bolt so that the plate may be moved upwardly and downwardly on the end 8 as desired by manipulation of the bolts.

A channel shaped rail member 176 is secured to the top of the platform 7 and spaced from the end 8 thereof. The channel member 176 is provided with a bolt 177 fixed to the lower side of the channel member, and the bolt 177 extends through opening 178 in plate 179 which has its respective ends engaging under the side rails 24 on the inside of the sides 10 and 11 of the platform and a nut 177' is threadably secured to the lower end of said bolt to engage the lower surface of plate 179 thus holding the channel member 176 in place. A tubular track member 180 is secured in the channel member 176 by welding or the like as indicated at 181. Secured to the end of the channel member by welding or other suitable means and extending outwardly from the end 8 of the platform 7 are tubular arm members 182 and 183 substantially square in shape. The outer ends of the tubular members are provided with an opening 184 adapted to receive a reduced threaded end 185 of studs 186 having knobs 187. Secured on short arms 188 which have threaded bores 189 to receive the threaded ends 185 of the studs 186 is a tubular track member 190.

A base 191 for a motor 192 is provided for movement on the tubular members 180 and 190. Brackets 193 are provided on the respective side edges at the rear of the base 191 having the lower level edges inclined as indicated at 194 to which are attached at an angle rollers 195 and 196 adapted to engage the respective upper sides of the tubular track member 180. At substantially the center of the base 191 near the outer edge thereof is a bracket 197 on which is mounted a roller 198 by a pin 199, the roller engaging upon the tubular track member 190. The motor 192 is provided with the usual shaft 200 on which is mounted a grinding tool 201. A housing 202 is provided for the grinding tool and at the upper end thereof is a hand hold 203 for use by a user for movement of the grinding tool across the structure when it is in contact with the stationary blade 115.

In operation of the structure as above described, and after the blade 115 has been mounted on the clamping members 152, the grinding tool is adjusted to the blade by manipulation of the threaded studs 186. Turning of the stud in a clockwise direction moves the tubular member 190 downwardly, consequently, lowering the outer end of the motor so that the grinding tool will contact the blade to be sharpened. When it is desired to raise the grinding tool, movement of the studs 186 in an anti-clockwise direction will raise the motor. When the proper adjustment is made the user takes a hold of the handle 203 to manually move the motor with its grinding tool across the trackways which comprise the tubular members 180 and 190. The V-shaped mounting of the rollers on the tubular member 180 provides for pivotal mounting of the motor. The set screw 204 at each end of the track 180 provides a stop for the motor base, the motor and its base being removable from the tubular members 180 and 190 as desired.

It will be obvious from the foregoing that I have provided an improved attachment for grinding machines for lawn mowers having novel clamping means for holding the stationary or bed blade on the machine and for adjustment of the grinding wheel to the blade.

What I claim and desire to secure by Letters Patent is:

1. In combination with a machine having a standard and an elongated platform carried on the standard and provided with a work support at an end of the platform adapted for mounting a blade to be sharpened, an attachment including a channel-shaped rail having the web portion thereof seated on the platform, a stud fixed to the rail and extending downwardly through the platform, clamping means on the stud for anchoring the rail in fixed position on the platform, arms fixed to the ends of the rail and projecting beyond the end of the platform having the work support, a track member supported in the channel-shaped rail, studs carried by the projecting ends of the arms, a track member having support by the studs and adapted to be raised and lowered with respect to the other track member upon adjusting the studs, a base, means carried by the base tiltably mounted on the track members and having support on the track members, and a motor driven tool on said base.

2. In combination with a machine having a standard and an elongated platform carried on the standard and provided with a work support at an end of the platform adapted for mounting a blade to be sharpened, an attachment including a channel-shaped rail having the web portion thereof seated on the platform, clamping means for securing the rail to the platform, arms fixed to the ends of the rail and projecting beyond the end of the platform having the work support, a tubular track member having fixed support in the channel-shaped rail, threaded studs carried by the projecting ends of the arms, a tubular track member having threaded connection with the studs and adapted to be raised and lowered with respect to the other track member upon turning of the studs, a motor base tiltably mounted on said track members, wheels carried by the motor base and having rolling support on the track members, a motor on the motor base, and a tool on the motor base actuated by said motor.

3. In combination with a machine having a standard and an elongated platform carried on the standard and provided with a work support at an end of the platform, an attachment for the machine including a fixed rail member extending transversely of the platform with the ends overhanging sides of the platform, arms fixed to the ends of the fixed rail member and extending beyond the end of the platform having the work support, means for clamping the fixed rail member to the platform, a complementary rail member, a motor base tiltably mounted on said rail members, a motor driven tool mounted on the motor base, wheels on the motor base having rolling support on the rail members, and studs journalled in ends of the arms and having threaded connection with the ends of the complementary rail member for adjustably raising and lowering the complementary rail member with respect to the fixed rail member to tilt the motor base and position the tool with respect to the work support.

JAMES M. PICKEL.

REFERENCES CITED

The following references are of record in the file of this patent:

UNITED STATES PATENTS

| Number | Name | Date |
|---|---|---|
| 348,753 | Le Roy | Sept. 7, 1886 |
| 1,389,588 | Klay | Sept. 6, 1921 |
| 2,149,774 | Ingleman | Mar. 7, 1939 |
| 2,187,289 | Utterback | Jan. 16, 1940 |
| 2,286,970 | Maynard | June 16, 1942 |

FOREIGN PATENTS

| Number | Country | Date |
|---|---|---|
| 619,401 | Great Britain | Mar. 9, 1949 |